United States Patent
Pratt

(10) Patent No.: US 11,464,218 B1
(45) Date of Patent: Oct. 11, 2022

(54) FISHING LINE SPOOLING STATION

(71) Applicant: Railblaza Limited, Auckland (NZ)

(72) Inventor: Christopher Ross Pratt, Auckland (NZ)

(73) Assignee: RAILBLAZA LIMITED, Auckland (NZ)

( * ) Notice: Subject to any disclaimer, the term of this patent is extended or adjusted under 35 U.S.C. 154(b) by 0 days.

(21) Appl. No.: 17/356,065

(22) Filed: Jun. 23, 2021

(51) Int. Cl.
*A01K 89/01* (2006.01)
*A01K 89/033* (2006.01)
*A01K 89/015* (2006.01)

(52) U.S. Cl.
CPC ...... *A01K 89/033* (2013.01); *A01K 89/01925* (2015.05)

(58) Field of Classification Search
CPC .. A01K 89/003; B65H 49/205; B65H 49/327; B65H 59/04; B65H 54/106; B65H 54/44
See application file for complete search history.

(56) References Cited

U.S. PATENT DOCUMENTS

| | | | |
|---|---|---|---|
| 3,951,354 A * | 4/1976 | Bagby | A01K 89/003 242/470 |
| 4,007,886 A * | 2/1977 | Kaminstein | A01K 89/003 242/596.7 |
| 4,588,139 A * | 5/1986 | Lines | A01K 89/003 242/570 |
| 5,551,645 A * | 9/1996 | Torvund | B65H 59/04 242/395 |
| 7,422,351 B2 | 9/2008 | Villani | |
| 9,016,614 B1 * | 4/2015 | Pouncil | A01K 89/003 242/598.5 |
| 9,281,976 B2 | 3/2016 | Hezar et al. | |
| 9,981,723 B2 | 5/2018 | Corley | |
| 10,149,466 B2 * | 12/2018 | Rogers | A01K 89/017 |
| 10,312,706 B2 | 6/2019 | Corley | |
| 10,701,916 B1 * | 7/2020 | Yu | B65H 49/327 |
| 10,787,239 B2 | 9/2020 | Corley | |
| 11,077,792 B2 | 8/2021 | Dhawan | |
| 11,351,104 B2 | 1/2022 | Huh et al. | |
| 2019/0075771 A1 * | 3/2019 | Gordon | A01K 89/01925 |

* cited by examiner

*Primary Examiner* — Emmanuel M Marcelo
(74) *Attorney, Agent, or Firm* — Andrew F. Young; Nolte Lackenbach Siegel

(57) ABSTRACT

A fishing line spooling station comprises a spool support having a first side and a second side and a side support extending perpendicularly from the first side of the spool support. The spool support includes an opening with side rails and a threaded central shaft. A brake slider having a brake face oriented toward the side support engages the rails and the central shaft and is positioned relative to the side support with a brake slide adjustment thumbscrew. The side support includes a height adjustment slot and a spool spindle extends perpendicularly from the side support.

12 Claims, 7 Drawing Sheets

FISHING LINE SPOOLING STATION

BACKGROUND

Fishing reels may be supplied with fishing line of various sizes, weights, compositions, and strengths depending upon the user's preferences and needs. A length of fishing line may be wound onto a fishing reel from a fishing line supply spool. During installation, proper tension may be maintained on the fishing line as it is unwound from the supply spool and wound onto the fishing reel, in order to avoid tangling, snagging, and coiling of the fishing line during the installation process and during subsequent use of the fishing reel.

BRIEF DESCRIPTION OF THE DRAWINGS

The present disclosure is best understood from the following detailed description when read with the accompanying figures, wherein.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

As used herein, to "provide" an item means to have possession of and/or control over the item. This may include, for example, forming (or assembling) some or all of the item from its constituent materials and/or, obtaining possession of and/or control over an already-formed item.

Figure 1:
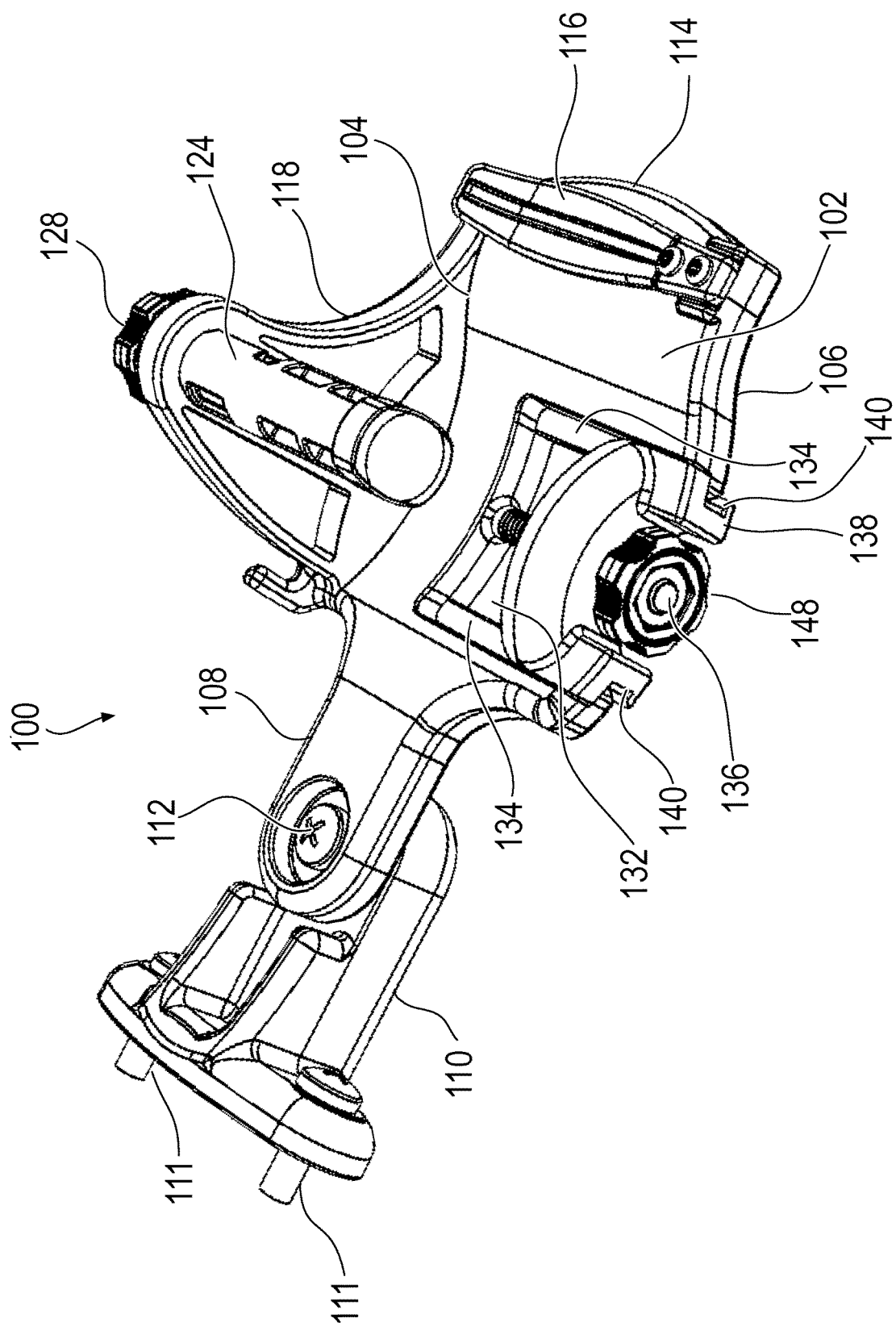
FIG. 1 is a first isometric view illustrating a fishing line spooling station according to one or more examples.
Figure 2:
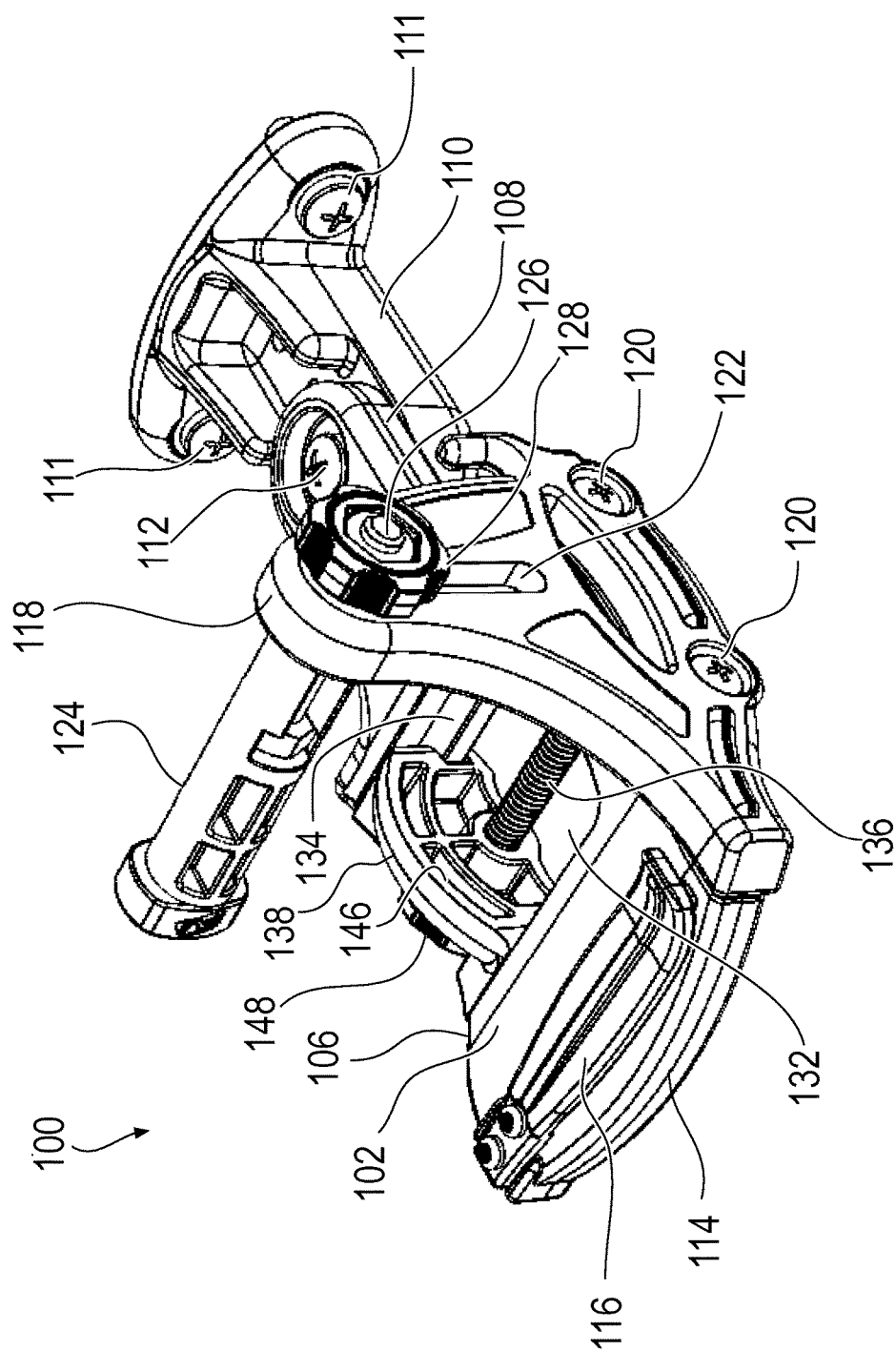
FIG. 2 is a second isometric view of the fishing line spooling station of FIG. 1.
Figure 3:
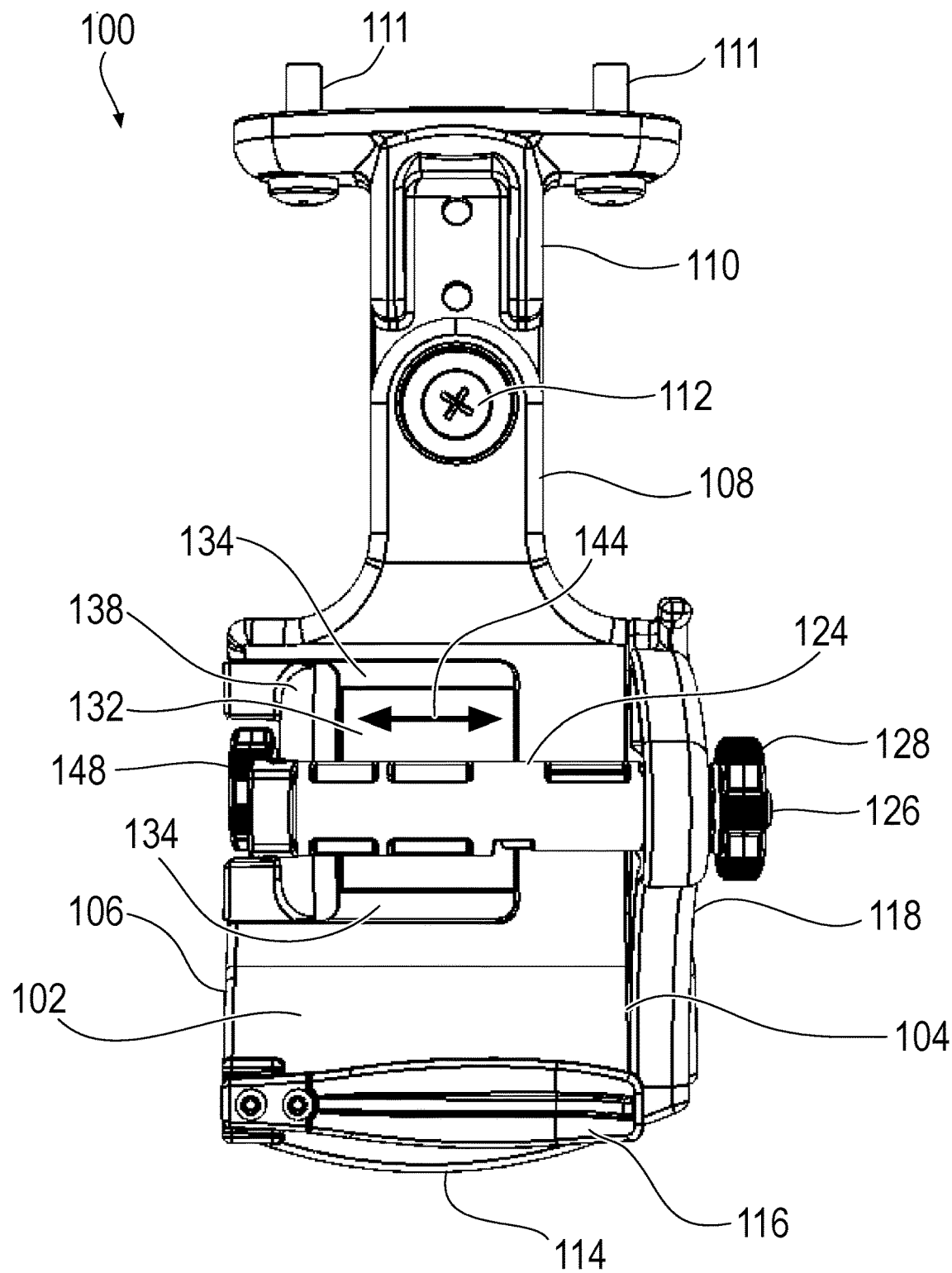
FIG. 3 is a top view illustrating the fishing line spooling station of FIG. 1.
Figure 4:
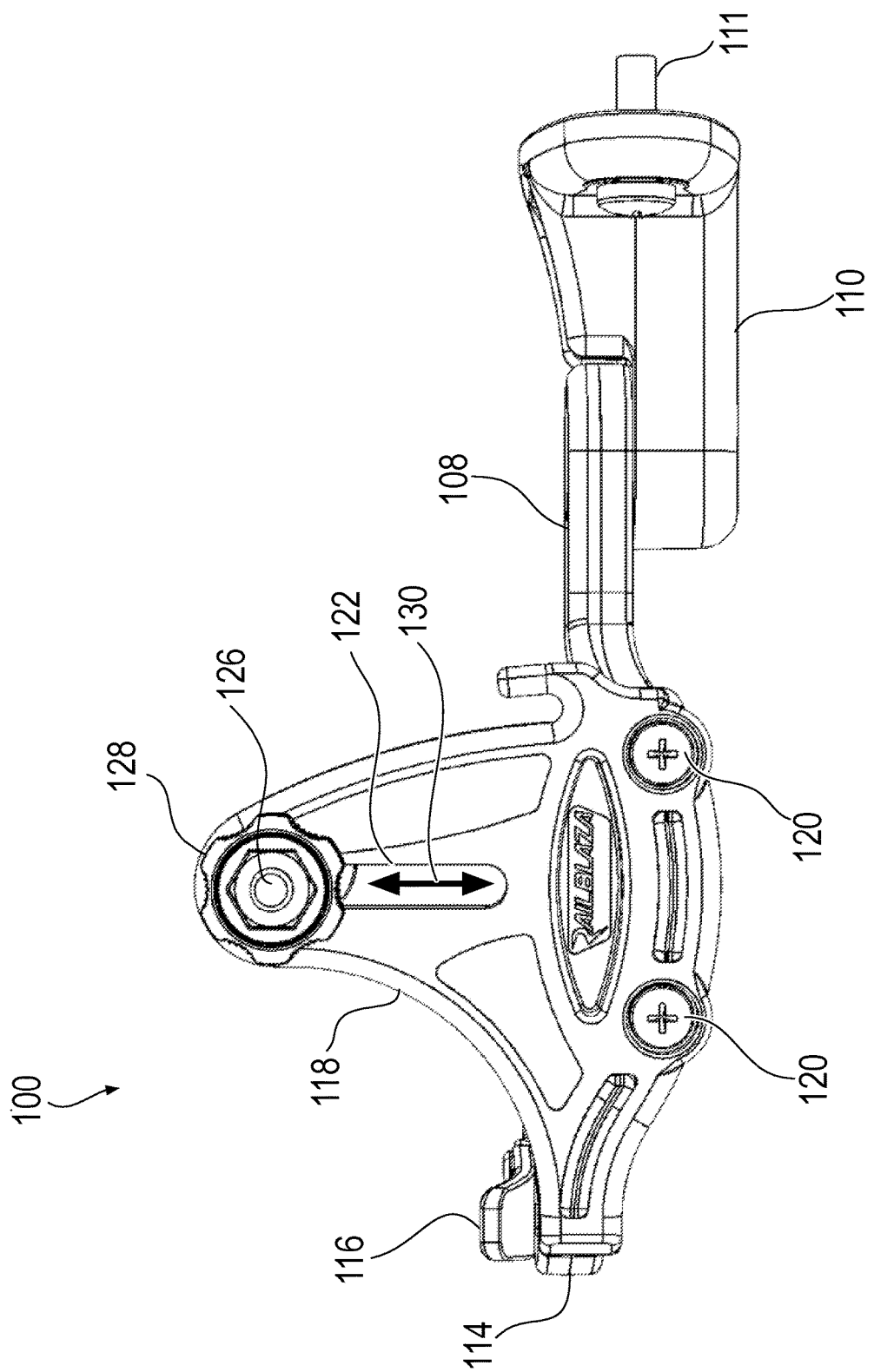
FIG. 4 is a side view illustrating the fishing line spooling station of FIG. 1.

FIG. 1-FIG. 2 are a first and second isometric view, respectively, of a fishing line spooling station 100 according to one or more examples. FIG. 3-FIG. 4 are a top view and a side view, respectively, of fishing line spooling station 100. As shown in FIGS. 1-4, collectively, fishing line spooling station 100 includes a spool support 102 having a first side 104 and a second side 106. A mounting portion 108 of spool support 102 is attached to a base structure 110 with a pivoting connection 112 (not visible in the view of FIG. 4). In various examples, pivoting connection 112 may be a threaded fastener extending through an aperture defined by the mounting portion 108 of spool support 102 and an aperture defined by the base structure 110. However, other examples may implement the pivoting connection 112 in other ways. In various examples, pivoting connection 112 enables spool support 102 to be oriented at various angles with respect to base structure 110.

Spool support 102 further includes an optional flexible fishing line clip 116 for retaining fishing line as it is unspooled from fishing line spooling station 100 as herein described. In examples, one or more fasteners 111, such as screws, may be provided for attachment of base structure 110 to a support (not shown). In examples, base structure 110 may be secured with fasteners 111 to a rail or other support on a fishing boat.

With continued reference to FIGS. 1-4, fishing line spooling station 100 further includes a side support 118 extending perpendicularly from first side 104 of spool support 102. In various examples, side support 118 may be attached to spool support 102 by one or more screws 120 (not visible in FIGS. 1 and 3). In other examples, side support 118 may be integrally formed with spool support 102 so that side support 118 and spool support 102 are formed of a single piece.

Side support 118 includes a height adjustment slot 122. A spool spindle 124 (not visible in FIG. 4) has a threaded end 126 (not visible in FIG. 1) extending through height adjustment slot 122 and secured to side support 118 with a thumbscrew 128. Spool spindle 124 extends perpendicularly from side support 118 at an adjustable height above spool support 102. In particular, height adjustment slot 122 permits spool spindle 124 to be positioned at various heights above spool support 102 to accommodate fishing line spools of various diameters, as herein described, and as indicated by arrow 130 in FIG. 4.

Figure 5:
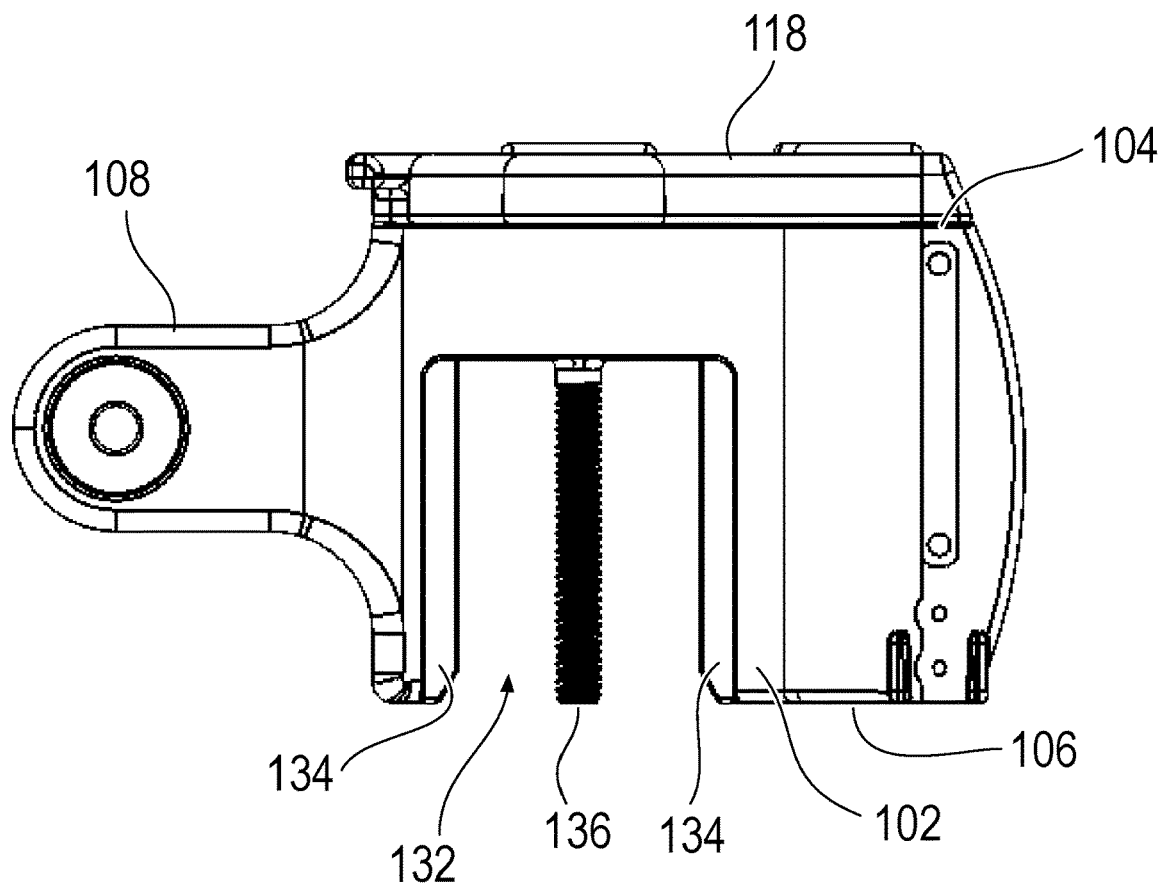
FIG. 5 is a top view illustrating a spool support and a side support of the fishing line spooling station of FIG. 1.

FIG. 5 is a top view of spool support 102 and side support 118 from FIGS. 1-4. In various examples, and as shown in FIG. 5 as well as in FIGS. 1-3, an opening 132 is formed in spool support 102 extending from second side 106 of spool support 102 toward side support 118 attached to first side 104 of spool support. A rail 134 is defined on each side of opening 132 extending from second side 106 of spool support 102 toward first side 104 of spool support 102. Further, as shown in FIGS. 1 and 2, a threaded shaft 136 extends within opening 132 in parallel to rails 134.

Figure 6:
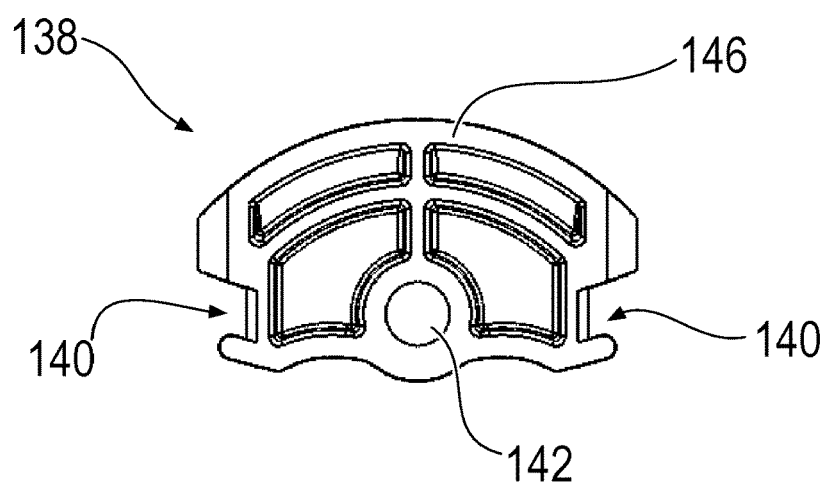
FIG. 6 is a front view illustrating a brake slider of the fishing line spooling station of FIG. 1.

FIG. 6 is a side view of a brake slider 138, also shown in FIGS. 1-3, configured to slide on rails 134 within opening 132 as shown in FIGS. 1-3. In particular, brake slider 138 includes opposing grooves 140 configured to engage rails 134 of spool support 102. Further, as shown in FIG. 6, brake slider 138 includes an opening 142 through which threaded shaft 136 extends, as shown in FIGS. 1-2. In examples, opening 142 is not threaded, enabling brake slider 138 to move back and forth on rails 134 in opening 132 as indicated by arrow 144 in FIG. 3. When brake slider 138 is engaged in rails 134 and threaded shaft 136, a front face 146 of brake slider 138, shown in FIGS. 2-3 and 6, is maintained parallel to side support 118. In examples, a brake adjustment thumbscrew 148 (shown in FIGS. 1-3) is engaged with threaded shaft 136 and controls the distance between front face 146 of brake slider 138 and side support 118.

Figure 7:
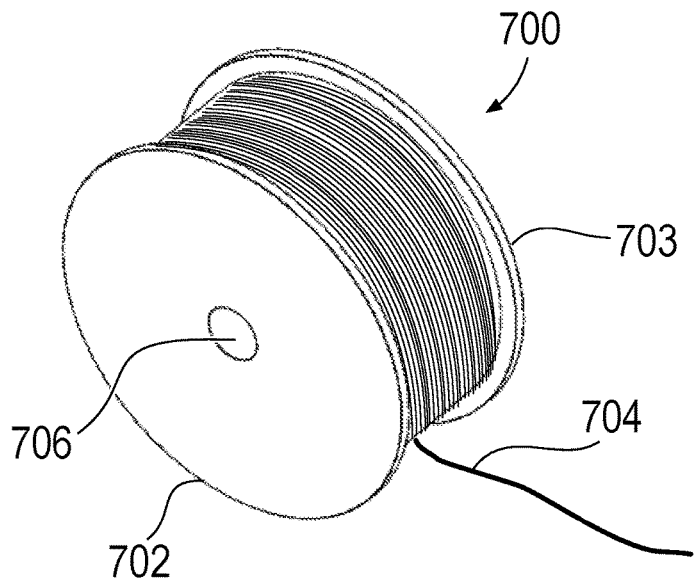
FIG. 7 is an isometric view illustrating a conventional fishing line supply spool.

FIG. 7 is an isometric view of a fishing line supply spool 700 with which fishing line spooling station 100 according to one or more examples may be used. As shown in FIG. 7, fishing line supply spool 700 includes first and second side faces 702 and 703 between which a length of fishing line 704 is wound. Supply spool 700 further includes a central opening 706 between side faces 702.

Figure 8:
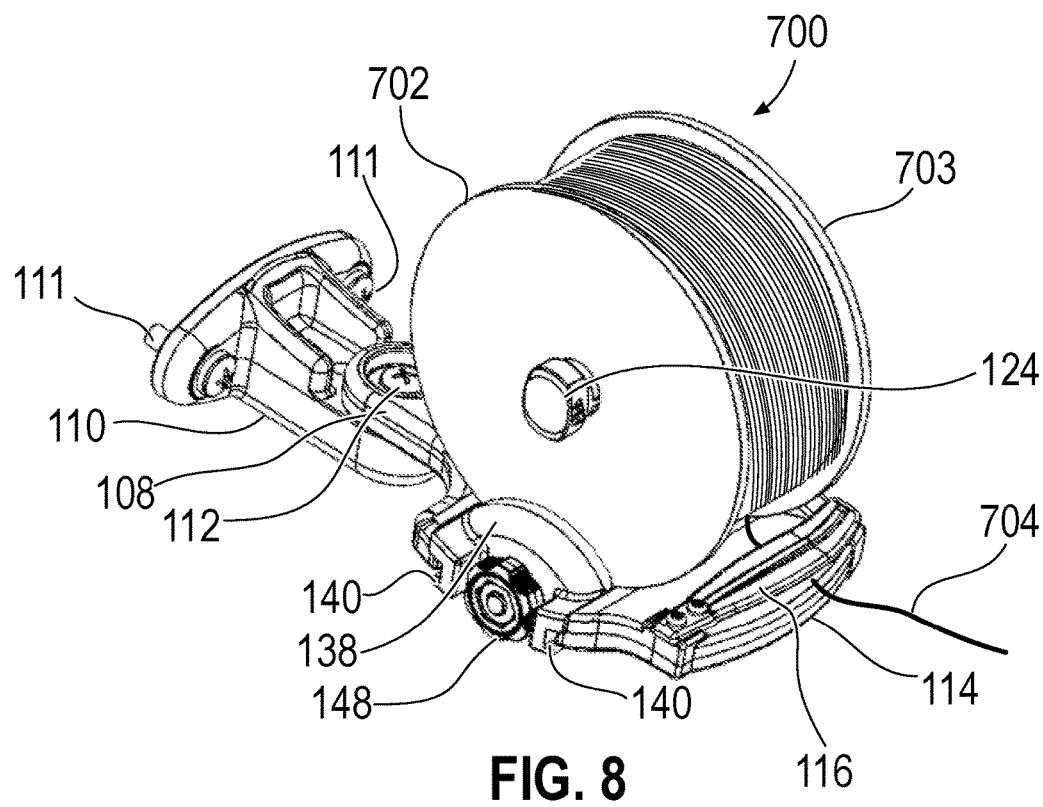
FIG. 8 is a first isometric view illustrating the fishing line spooling station of FIG. 1 with the fishing line supply spool of FIG. 7 installed therein.
Figure 9:
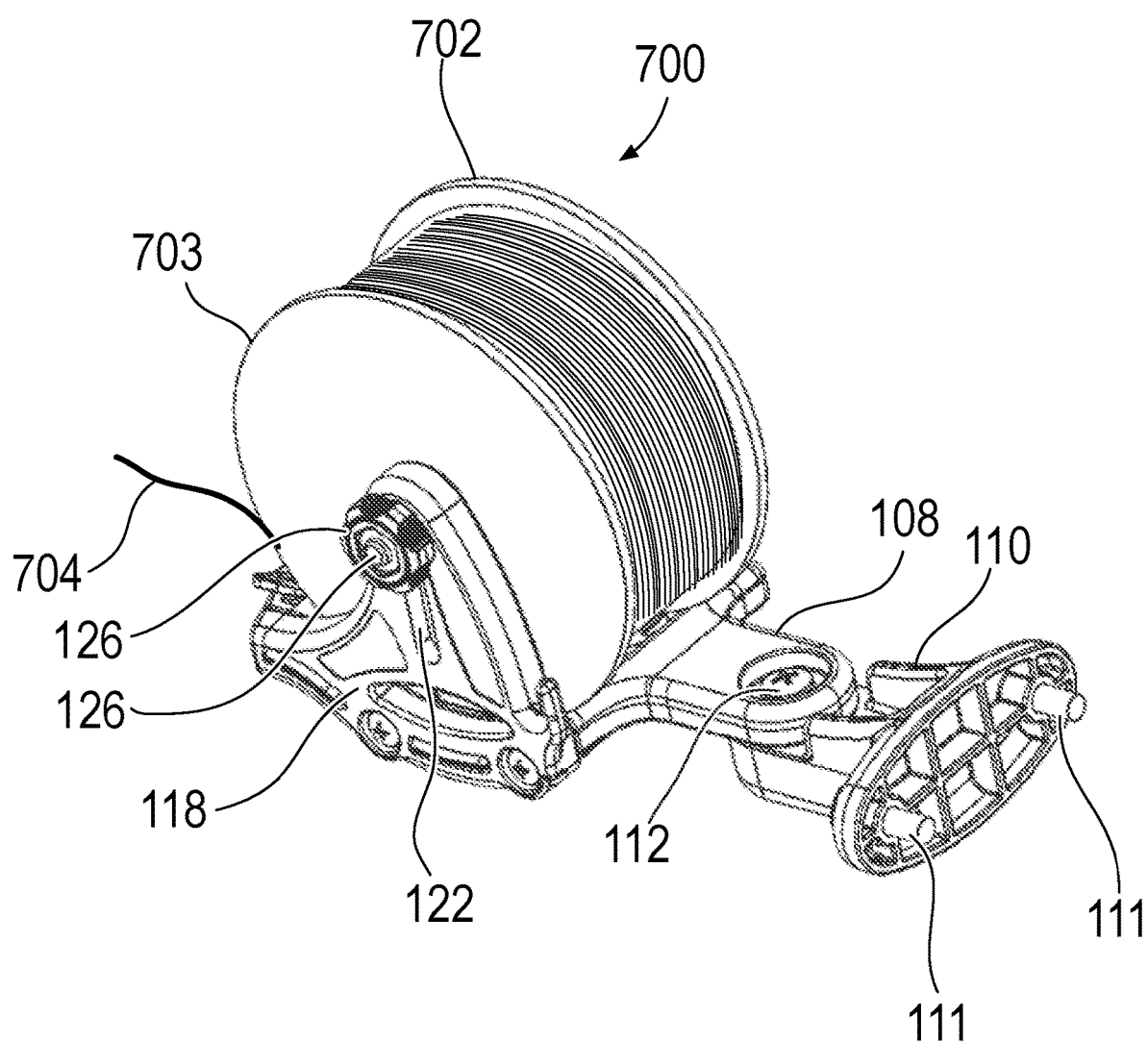
FIG. 9 is a second isometric view illustrating the fishing line spooling station of FIG. 1 with the fishing line supply spool of FIG. 7 installed therein.

FIGS. 8-9 are isometric views of supply spool 700 from FIG. 7 installed in fishing line spooling station 100 according to one or more examples. As shown in FIG. 8, supply spool 700 is supported on spool support 102 with spool spindle 124 extending through central opening 706 of supply spool.

Due to the arrangement of spool spindle 124 and height adjustment slot 122, in examples, fishing line spooling station 100 may accommodate supply spools of varying diameters. To install a supply spool such as supply spool 700, thumbscrew 128 may be removed from threaded end 126 of spool spindle 124. Spool spindle 124 may be inserted through central opening 706 of supply spool 700, with threaded end 126 of spool spindle 124 extending out of side face 703 of supply spool 700. Threaded end 126 of spool spindle 124 may then be inserted through height adjustment slot 122 of side support 118, with side face 703 contacting side support 118 of fishing line spooling station 100. Spool spindle 124 may then be secured to side support 118 by tightening thumbscrew 128 at a height at which side faces 702 and 703 of supply spool 700 rest on spool support 102.

Brake adjustment thumbscrew 148 may be advanced along threaded shaft 136 to a point at which front face 146 of brake slider 138 contacts side face 702 of supply spool 700. Brake adjustment thumbscrew 148 may be tightened sufficiently to provide a desired amount of force to create tension on the rotation of supply spool 700 around spool spindle 124. This tension may be increased or decreased as desired by an operator according to specific needs and preferences by tightening or loosening brake adjustment thumbscrew 148 on threaded shaft 136.

During use, fishing line spooling station 100 may be mounted on a support with fasteners 111, as previously described. A supply spool 700 may be installed as described herein and as shown in FIGS. 8-9, with fishing line 704 from supply spool 700 retained beneath flexible fishing line clip 116, as shown in FIGS. 8-9. Flexible fishing line clip 116 may serve to constrain the unwinding of fishing line 704 off of supply spool 700 to prevent fishing line 704 from tangling, and to maintain the direction of fishing line 704 as it is unwound off of supply spool 700.

As fishing line 704 is unwound from supply spool 700 onto a fishing reel (not shown), a desired amount of tension may be maintained on fishing line 704 through adjustment of brake adjustment thumbscrew 148 to cause front face 146 of brake slider 138 to contact side face 702 and thereby compress supply spool 700 between front face 146 of brake slider 138 and side support 118.

The foregoing description, for purposes of explanation, uses specific nomenclature to provide a thorough understanding of the disclosure. However, it will be apparent to one skilled in the art that the specific details are not required in order to practice the systems and methods described herein. Various substitutions, modifications, and variations of the examples described herein may be made in a given implementation.

The foregoing descriptions of specific examples are presented for purposes of illustration and description. Examples herein are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:
1. A fishing line spooling station, comprising:
 a spool support having a first side and a second side;
 a side support extending perpendicularly from the first side of the spool support;
 an opening defined by the second side of the spool support extending toward the first side of the spool support, the opening having side rails extending perpendicularly from the second side of the spool support toward the first side of the spool support;
 a threaded shaft extending within the opening between and parallel to the side rails and perpendicularly to the side support;
 a spool brake slider, the spool brake slider defining a brake face oriented toward the side support and having grooves for slidably engaging the side rails of the opening, and further having a central bore for passage of the threaded shaft therethrough;
 a height adjustment slot in the side support, the height adjustment slot extending substantially perpendicularly to the spool support;
 a spindle extending perpendicularly from the side support and having a threaded end passing through the height adjustment slot;
 a second thumbscrew, engaging the threaded end of the spindle to secure the spindle to the side support at an adjustable height above the spool support.

2. The fishing line spooling station of claim 1, further comprising:
 a brake adjustment thumbscrew threadably engaged with the threaded shaft, to adjustably restrict positioning of the spool brake slider in the opening relative to the side support.

3. The fishing line spooling station of claim 2, further comprising:
 a base structure for attachment to a support, the base structure pivotably attached to the spool support; and
 a pivoting connection between the spool support and the base structure.

4. The fishing line spooling station of claim 3, wherein the pivoting connection between the spool support and the base structure comprises a threaded fastener.

5. The fishing line spooling station of claim 3, further comprising:
 a flexible clip on a front end of the spool support for guiding fishing line unspooled from a supply spool.

6. A fishing line spooling station, comprising:

a main spool support having a first side and a second side;

a side support extending perpendicularly from the first side of the main spool support;

an opening defined by the second side of the main spool support extending toward the first side of the main spool support, the opening having side rails extending perpendicularly from the second side of the main spool support toward the first side of the main spool support;

a spindle extending perpendicularly from the side support;

means for braking rotation about the spindle within the opening;

a spool brake slider, the spool brake slider defining a brake face oriented toward the side support and having grooves for slidably engaging the side rails of the opening, and further having a central bore for passage of a threaded shaft therethrough;

means for adjusting a height of the spindle relative to the main spool support; and means for engaging and securing the spindle to the side support at an adjustable height above the main spool support.

7. The fishing line spooling station of claim 6, further comprising a brake adjustment thumbscrew threadably engaged with the threaded shaft, to adjustably restrict positioning of the spool brake slider in the opening relative to the side support.

8. The fishing line spooling station of claim 7, further comprising:

a base structure for attachment to a support, the base structure pivotably attached to the spool support; and pivoting means between the spool support and the base structure.

9. The fishing line spooling station of claim 8, wherein the pivoting means between the spool support and the base structure comprises a threaded fastener.

10. A method of retaining a fishing line supply spool in a fishing line spooling station having a spool support, comprising:

inserting a spool spindle through a central opening of the fishing line supply spool;

securing the spool spindle to a side support through a height adjustment slot in a side support of the fishing line spooling station, the side support extending perpendicularly from the spool support;

advancing a brake slider against a side of the fishing line supply spool to compress the fishing line supply spool against the side support; and wherein the brake slider advances on rales formed in an opening in the spool support.

11. The method of claim 10, wherein advancing the brake slider against a side of the fishing line supply spool comprises a rotating thumbscrew passing through an opening in the brake slider.

12. The method of claim 10, wherein securing the spool spindle to the side support comprises securing the spool spindle within the height adjustment slot at a height corresponding to the size of the fishing line supply spool.

\* \* \* \* \*